Dec. 15, 1970 MASAO TOMITA ET AL 3,548,334

NOISE REDUCTION CIRCUIT AND SYSTEM

Filed July 28, 1969 5 Sheets-Sheet 1

INVENTORS
MASAO TOMITA
TETSUO HINO

BY *Wenderoth, Lind & Ponack*
ATTORNEYS

INVENTORS
MASAO TOMITA
TETSUO HINO

BY Wenderoth, Lind & Ponack
ATTORNEYS

Dec. 15, 1970 MASAO TOMITA ET AL 3,548,334

NOISE REDUCTION CIRCUIT AND SYSTEM

Filed July 28, 1969 5 Sheets-Sheet 3

INVENTORS
MASAO TOMITA
TETSUO HINO

BY Wenderoth, Lind & Ponack
ATTORNEYS

INVENTORS
MASAO TOMITA
TETSUO HINO

BY Wenderoth, Lind & Ponack
ATTORNEYS

INVENTORS
MASAO TOMITA
TETSUO HINO

BY Wenderoth, Lind & Ponack
ATTORNEYS 3,548,334

NOISE REDUCTION CIRCUIT AND SYSTEM

Masao Tomita, Moriguchi-shi, and Tetsuo Hino, Hirakata-shi, Japan, assignors to Matsushita Electric Industrial Company Limited, Osaka, Japan Filed July 28, 1969, Ser. No. 845,206
Int. Cl. H03f 3/68
U.S. Cl. 330—124 12 Claims

ABSTRACT OF THE DISCLOSURE

A noise reduction circuit. The circuit has a variable attenuator including at least two diodes and one resistor. The degree of attenuation of the variable attenuator is varied by means of a bias voltage source and a rectifier device connected across the diodes. When an input signal is not supplied, a D.C. control voltage is not supplied from the rectifier device and a forward current is supplied to the diodes by the bias source. In this case the degree of attenuation is a maximum. When an input signal is supplied, the D.C. control voltage is provided to the diodes so as to bias the diodes backwardly, so that there is no forward current and the degree of attenuation is a minimum. Accordingly, the output noise can be removed during pauses in the input signal.

FIELD OF THE INVENTION

This invention relates generally to noise reduction circuits and more particularly to noise reduction circuits for amplifiers and the like operating in the audio frequency range.

PRIOR ART

In general, the output signal derived from amplifiers contains various noises such as amplifier noise, recording medium noise, and so on. Therefore the signal-to-noise ratio of the output signal of amplifiers is limited and the quality of the output signal is reduced. Up to present, several methods for reducing noise have been developed. For example, in a noise reduction system which has been developed for recording and reproducing apparatus, the signal to be recorded is modified by employing a first non-linear device so as to emphasize the low level component of the signal and the signal reproduced from the recording medium is modified by a second non-linear device having complementary characteristics to that of the first non-linear device so that a signal having the same waveform as that of the original signal can be reproduced.

However, this noise reduction system has several disadvantages. Because the linearity of the output signal depends on the degree of coincidence of the complementary characteristics, it is necessary to adjust the characteristics precisely. Since it is difficult to adjust the complementary characteristics precisely harmonic distortion is apt to appear in the output signal. Moreover, the circuit arrangement becomes complex, because the non-linear devices are necessary for both the recording process and the reproducing process.

SUMMARY OF THE INVENTION

A general object of the invention is to provide a noise reduction circuit which removes noises during the absence of signals.

Another object of the invention is to provide a noise reduction circuit which does not produce degeneration of signals due to distortion and frequency response alteration.

Still another object of the invention is to provide a noise reduction circuit which varies the degree of the noise attenuation according to the amplifier gain.

A further object of the invention is to provide a noise reduction circuit and system which is controlled by the transient state of noise attenuation.

A still further object of the invention is to provide a new improved noise reduction system which reduces modulation noises without degeneration of signals due to distortion.

An additional object of the invention is to provide a novel noise reduction system for stereophonic amplifiers.

It is a still further object of the invention to provide a noise reduction system which controls the undesirable large gain caused in automatic gain control amplifiers during the absence of the input signals.

This invention provides crcuits and systems for achieving these objects.

One embodiment of noise reduction circuits according to the invention comprises a variable attenuator including two diodes connected in series, the resistance thereof is varied in accordance with bias of the diodes; one input resistor connected between a signal input terminal and a junction point of the diodes; a source of bias voltage for providing a forward bias to the diodes of the variable attenuator when no input signal is present; output means, for example, a conventional amplifier, for deriving the signal from the variable attenuator and for supplying the output signal to a suitable load device; and a rectifier for providing a D.C. voltage, which is proportional to the input signal, to the diodes in the reverse bias direction. The input signal is applied to the variable attenuator through the input resistor. The state of the variable attenuator is changed by changing the bias of the diodes. The diodes are biased forwardly by means of the biasing source when the signal is not present, and biased reversely by means of the rectifier when the signal is present. Therefore, a maximum attenuation, i.e. "a noise reducing condition," is obtained when no signals are supplied and a minimum attenuation, i.e. "a signal passing condition," is obtained when signals are applied. As a result, when no input signals are supplied, noise in the output can be removed.

BRIEF DESCRIPTION OF THE DRAWINGS

The invention will now be described with reference to the accompanying drawings, in which.

DETAILED DESCRIPTION OF THE EMBODIMENTS

Figure 1:
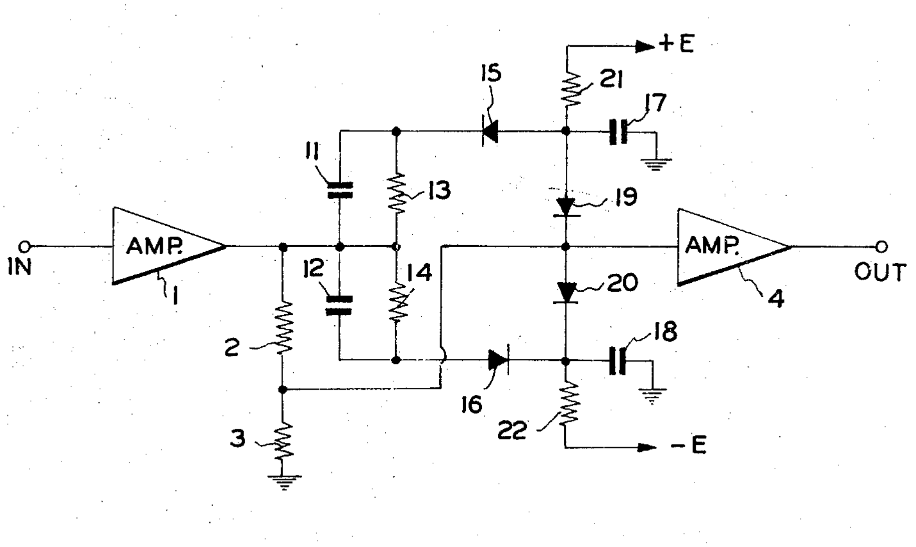
FIG. 1 is a circuit diagram of the basic noise reduction circuit according to the present invention.

In the circuit diagram shown in FIG. 1, the input signal containing the background noise is supplied to an input terminal IN and is amplified by a conventional pre-amplifier 1 to which the input terminal is connected.

The output of the pre-amplifier 1 is connected to one junction point of parallel connected capacitor 11 and resistor 13 and to one junction point of parallel connected capacitor 12 and resistor 14. Also connected to that junction point is a voltage divider which consists of a resistor 2 in series with a resistor 3 connected to ground. The junction point of resistors 2 and 3 is connected to the junction point of diodes 19 and 20 which are connected in series and having the poles thereof in the same direction. The output signals are derived through a conventional amplifier 4 connected between the junction point of diodes 19 and 20 to a load arrangement (not shown). The anode electrode of the diode 19 is connected to a junction point of a positive D.C. supply, not shown but indicated as +E, through a resistor 21 and to a capacitor 17, the other side of which is connected to ground. Similarly, the cathode electrode of the diode 20 is connected to a junction point of a negative D.C. supply, not shown but indicated as −E, through a resistor 22 and to a capacitor 18, the other side of which is connected to ground. The cathode electrode of a rectifier diode 15 is connected to the other junction point of the resistor 13 and the capacitor 11 and the anode electrode thereof is connected to the junction point of the resistor 21 and he capacitor 17. Similarly, the anode electrode of a rectifier diode 16 is connected to the other junction point of the resistor 14 and the capacitor 12 and the cathode electrode thereof is connected to the junction point of the resistor 22 and the capacitor 18.

Referring o FIG. 1, the signal applied to the input terminal is amplified to a moderate amount by the pre-amplifier 1 and fed to the rectifier device consisting of diodes 15 and 16, resistors 13 and 14, capacitors 11 and 12, and the storage capacitor 17 and 18. Since the diode 15 is connected so that the signal is provided at the cathode electrode thereof, there results a rectified negative D.C. voltage across the capacitor 17. The diode 16 is similarly connected to the diode 15 except that it has an opposite polarity, and the rectified D.C. voltage The amplified signal is also applied across the voltage divider which consists of resistors 2 and 3 and the divided signal is fed to the junction point of the diodes 19 and 20 which act as a variable resistance circuit. Since the storage capacitors 17 and 18 can also serve as bypass capacitors, the small signal resistance of the variable resistor device is entirely determined by the resistances of the diodes, which vary in accordance with the bias on the diodes.

When the input signal exceeds the predetermined threshold level, at which the noise reducing action starts, the voltages stored in the capacitors 17 and 18 rise. These stored voltages are much higher than the signal voltage at the junction point of the diodes 19 and 20 because of the presence of the voltage divider consisting of the resistors 2 and 3, thus allowing to reverse bias of the diodes 19 and 20. The reverse biasing of the diodes results in a very large resistance in the variable resistance circuit. Accordingly, the signal applied to the circuit passes without attenuation and is amplified by the output amplifier 4 and is supplied to the load arrangement.

When the input signal is lower than the threshold level, or during pauses in the signal, a sufficient voltage for reversely biasing the diodes 19 and 20 is not stored in the capacitors 17 and 18. Therefore, a forward current flows from the positive D.C. supply +E to the negative. D.C. supply −E through the bias resistor 21, the diodes 19 and 20, and the bias resistor 22. This resistance of the variable resistance circuit becomes very much lower than that of the parallel combination of the resistors 2 and 3. Accordingly, the noise signal supplied to the variable resistance circuit is greatly attenuated. In this circuit, the attack time period from the end of the attenuation until the initiation of the passing of a signal is determined by the forward resistance of the diodes 15, 16 and the capacitance of the capacitors 17, 18 since the capacitors 11 and 12 are chosen so that the capacitances thereof are very much larger than that of the capacitors 17, 18. The forward resistance of the diodes is very low: such as several tens of ohms, therefore the attack time can be set as low as 10 msec. so as not to affect the quality of the signal.

The discharge time constant of the D.C. voltage stored in the storage capacitors 17 and 18 or the time period from the end of the passing of a signal until the initiation of the action of reducing noise, is determined by the capacitor 17 and the resistor 21 or the capacitor 18 and the resistor 22. Usually, the capacitance of the capacitor 17 is equal to that of the capacitor 18 and the resistance of the resistor 21 is made equal to that of the resistor 22.

The threshold level essentally depends on both the stored voltage in the capacitors 17 and 18 and the amplitude of the signal applied to the variable resistance circuit. Since the signal applied to the variable resistance circuit is controlled by varying the dividing ratio of the voltage divider consisting of the resistors 2 and 3, the threshold level is adjusted so as to exceed slightly the noise level, whereby during pauses in the signal the output noise is eliminated.

Figure 2:
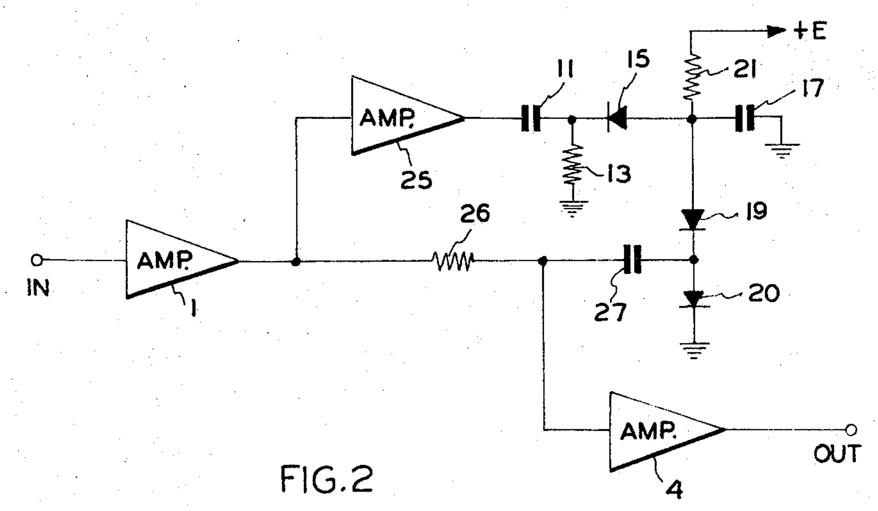
FIG. 2 is a circuit diagram of another noise reduction circuit according to the present invention.

The circuit shown in FIG. 2 is another embodiment according to the invention.

In FIG. 2, the input signal containing the background noise is amplified by a conventional pre-amplifier 1. The output of the pre-amplifier 1 is connected to a junction point of a control signal amplifier 25 and an input resistor 26. The other end of resistor 26 is connected to the junction point of diodes 19 and 20, which are connected in series and having the poles thereof in the same direction, through a capacitor 27. The output signal is derived through a conventional output amplifier 4 from the junction point of resistor 26 and capacitor 27 and supplied to a load arrangement. The anode electrode of the diode 19 is connected to a positive D.C. supply, not shown but indicated as +E, through a resistor 21 and to a capacitor 17, the other side of which is connected to ground. The cathode electrode of the diode 20 is grounded. The cathode electrode of a rectifier diode 15 is connected to the output terminal of the control signal amplifier 25 through a capacitor 11 and to a resistor 13, the other side of which is connected to ground, and the anode electrode of the rectifier diode 15 is connected to the junction point of the resistor 21 and the capacitor 17.

The signal applied to the input terminal is amplified a moderate amount by the pre-amplifier 1 and fed to the control signal amplifier 25. The output of control signal amplifier 25 is fed to the rectifier device consisting of the capacitor 11, resistor 13, diode 15 and the storage capacitor 17. Since the diode 15 is connected such a way that the signal is provided at the cathode electrode of the diode 15 and the anode electrode thereof is connected to the capacitor 17, there results a rectified negative D.C. voltage across the capacitor 17. The output signal of the pre-amplifier 1 is also applied to the junction point of the diode 19 and 20, which serve as a variable resistance, through the resistance resistor 26 and capacitor 27. The small signal resistance of the diodes varies in accordance with the bias thereof. Since the storage capacitor 17 can also serve as the by-pass capacitor, the small signal resistance of the variable resistance crcuit is almost completely determined by the resistance of the diodes.

When the input signal exceeds the predetermined threshold level, the voltage stored in the capacitor 17 rises. This stored voltage is much higher than the signal voltage at the junction point of the diodes 19 and 20 because of the presence of the control signal amplifier 25, thus causing reverse bias of the diodes 19 and 20. The reverse biasing of the diodes results in a very large resistance of the variable resistance circuit as compared with the resistance of the input resistor 26. Accordingly, the signal applied to the variable resistor passes without attenuation and is amplified by the output amplifier 4, and supplied to the load arrangement. When the input signal is lower than the threshold level, or during pauses in the signal, sufficient voltage for reversely biasing the diodes 19 and 20 is not stored in the capacitor 17. Therefore, the forward current flows from a positive D.C. supply +E into the diodes 19 and 20 through the bias resistance 21. The resistance of the variable resistor becomes very much lower than the resistance of input resistor 26, and thus the signal applied to the variable resistance is attenuated. The attenuation ratio can be 20 db or over. In this circuit, the attack time, the time period from the end of the attenuation until the initiation of the passing of a signal, is mainly determined by the forward resistance of the diode 15 and the capacitance of the capacitor 17. The capacitance of capacitor 11 is chosen so that it is very large compared to that of the capacitor 17. Since the forward resistance of the diode is very low, such as several ten ohms, the attack time can be easily set to a value as low as 10 ms. so as not to affect the quality of the signal. The discharge time constant of the D.C. voltage stored in the storage capacitor 17, or the time period from the end of the passing of a signal until the initiation of the action of reducing noise, is determined by the capacitor 17 and the resistor 21. The threshold level essentially depends on the stored voltage in the capacitor 17 and the amplitude of the signal applied to the variable resistance. Since the stored voltage is controlled by varying the gain of the control signal amplifier 25, the threshold level is adjusted so that it exceeds slightly the noise level, whereby during pauses in the signal the output noise is eliminated.

Figure 3:
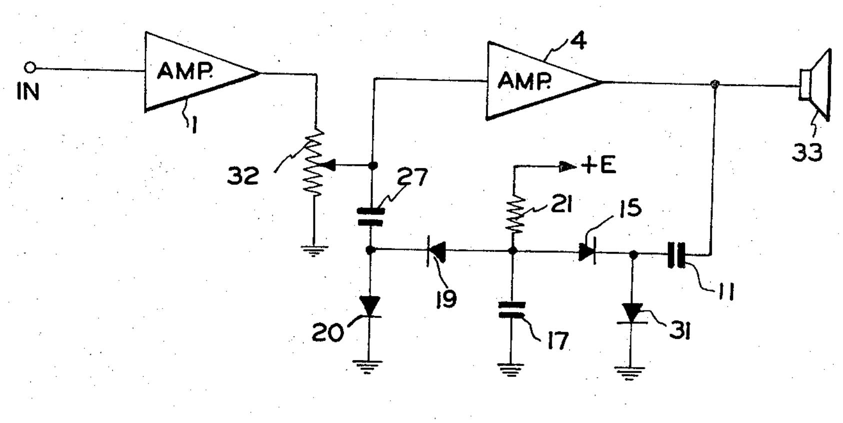
FIG. 3 is a circuit diagram of an amplifier system having a volume controller employing a noise reduction circuit according to the present invention.

The circuit shown in FIG. 3 is an embodiment in which the circuit shown in FIG. 2 is applied to an amplifier system including a potentiometer for volume control. In FIG. 3, the input signal containing the background noise is amplified by a conventional pre-amplifier 1. The output signal of the pre-amplifier 1 is adjusted to a suitable value by a potentiometer 32 and amplified by a conventional output amplifier 4, and then applied to a speaker 33 which constitutes a load arrangement. The movable contact of the potentiometer 32 is connected to the junction point of diodes 19 and 20, connected in series and having the poles in the same direction, through a capacitor 27. The anode electrode of the diode 19 is connected to a positive D.C. supply, not shown but indicated as +E, through a resistor 21 and to a capacitor 17, the other side of which is connected to ground. The cathode electrode of the diode 20 is grounded. A cathode electrode of a rectifier diode 15 is connected to the output amplifier 4 through a capacitor 11 and to the anode electrode of a diode 31, the cathode end of which is connected to ground. The anode electrode of the diode 15 is connected to the junction of the resistor 21 and the capacitor 17.

Referring to FIG. 3, the signal applied to the input terminal is amplified a moderate amount by the pre-amplifier 1 and fed to the potentiometer 32. The signal adjusted by the potentiometer 32 is amplified by the output amplifier 4 and is fed to the rectifier device consisting of the capacitor 11, diodes 15 and 31 and storage capacitor 17. This rectifier device is a voltage-doubler rectifier which is well known. Since the diode 15 is connected in such a way that the signal is provided at the cathode electrode thereof and the anode electrode thereof is connected to the capacitor 17, there is produced a rectified negative D.C. voltage across the capacitor 17. The signal adjusted by the potentiometer 32 is also applied to the junction point of the diodes 19 and 20 which act as a variable resistance circuit through the capacitor 27. The small signal resistance of the diodes varies in accordance with the amount of bias. Since the storage capacitor 17 can also act as a by-pass capacitor, the small signal resistance of the variable resistance circuit device is almost completely determined by the resistance of diodes.

When the input signal exceeds the predetermined threshold level, the voltage stored in the capacitor 17 is increased. This stored voltage is much larger than the signal voltage at the junction point of the diodes 19 and 20 because of the presence of the output amplifier 4, so that the diodes 19 and 20 are reversely biased. The reverse biasing of the diodes results in a very large resistance of the variable resistance circuit as compared with the resistance of the input resistor, which is the output resistance at the movable contact of the potentiometer 32. Accordingly, the signal applied to the variable resistor passes without attenuation and is amplified by the output amplifier 4, and applied to the speaker 33 which constitutes the load arrangement. When the input signal is lower than the threshold level, or during pauses in the signal, insufficient voltage for biasing reversely the diodes 19 and 20 is stored in the capacitor 17. Therefore, a forward current flows from the positive D.C. supply +E to the diodes 19 and 20 through the bias resistance circuit 21. The resistance of the variable resistor becomes very much lower than the resistance of the input resistor. Accordingly, the signal applied to the variable resistance circuit is attenuated.

In this circuit, the attach time can be set to be 10 ms. or lower just as in the embodiment shown in FIG. 2, and the discharge time constant is determined by the capacitor 17 and the resistor 21. The threshold level is controlled by varying the gain of the output amplifier 4 and it is not affected by adjusting the movable contact of the potentiometer 32. The noise reduction ratio is determined by the output resistance of the potentiometer and the resistance of diodes 19 and 20 when biased forwardly. The noise reduction ratio is almost proportional to the output resistance of the potentiometer since the forward resistance of the diode is negligible and constant. Furthermore the output resistance of the pre-amplifier 1 is made to be much larger than the resistance of the potentiometer 32. Therefore, the noise reduction ratio is proportional to the position of the volume control. As a result, the noise attenuation at a low position of the volume control is low, thus making it possible to provide natural sounds.

Figure 4:
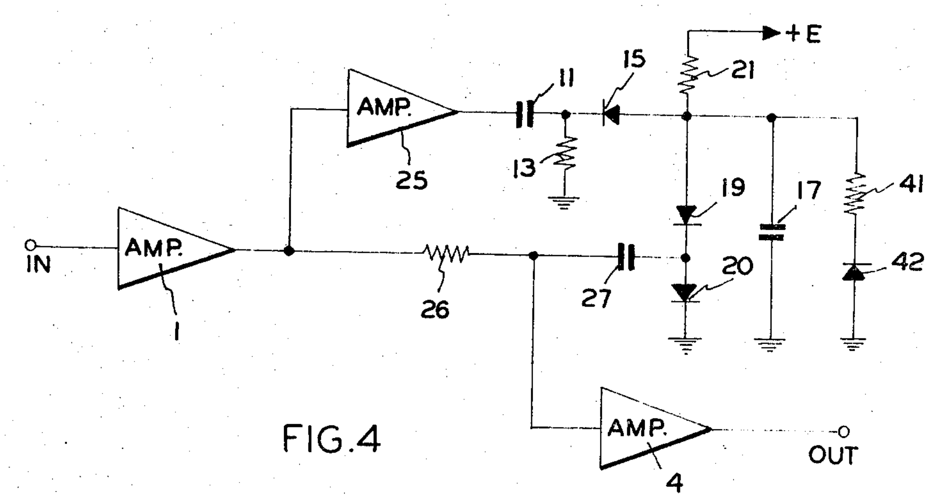
FIG. 4 is a circuit diagram of another noise reduction circuit which improves the transient performance according to the present invention.

The embodiment shown in FIG. 4 is a circuit which improves the performance during the transient period of noise attenuation after a pause in the signal. Since the circuit shown in FIG. 4 is the same as the circuit diagram shown in FIG. 2 except for the addition of resistor 41 and diode 42, only the operation of the additional position of the circuit is described hereinafter. The resistor 41 and the diode 42 are connected in series and one end of the resistor 41 is connected to the junction point of the storage capacitor 17, bias resistor 21, rectifier diode 15 and variable resistor diode 19, and the anode electrode of the diode 42 is connected to ground.

When the input signal is lower than the threshold level, the storage capacitor 17 is not charged to a sufficient negative voltage, and the forward current flows through the bias resistor 21 to the diodes 19 and 20. In this case, the diode 42 is biased reversely and the series circuit of resistor 41 and diode 42 has no influence on the other circuit. When the input signal is higher than the threshold level, the storage capacitor 17 is charged to a sufficient negative voltage, and the diode 19 and 20 are biased reversely. Then, the diode 42 is forwardly biased by the negative voltage across the capacitor 17 and the series circuit comprised of the resistor 41 and diode 42 act as an additional discharging circuit for the storage capacitor 17. The resistance of the resistor 41 is chosen so as to be much lower than the resistance of the resistor 21. Therefore, as soon as the signal pauses, the stored voltage in the storage capacitor 17 begins to discharge rapid through the resistor 41 and the diode 42 to ground, so that the stored voltage is reduced in value and the diode 42 is in cut off. Accordingly, the discharging circuit consisting of the resistor 41 and diode 42 is cut off, and the remainder of the stored voltage is discharged slowly through the resistor 21. Since the resistance of the variable resistance circuit constituted by the diodes 19 and 20 varies according to the voltage across the diodes when the signal pauses, the noise is reduced rapidly to a certain level and then is reduced slowly to the minimum level. Such a noise reducing action is very comfortable for the hearing because as soon as the signal pauses the noise begins to be reduced quickly and smoothly.

Figure 5:
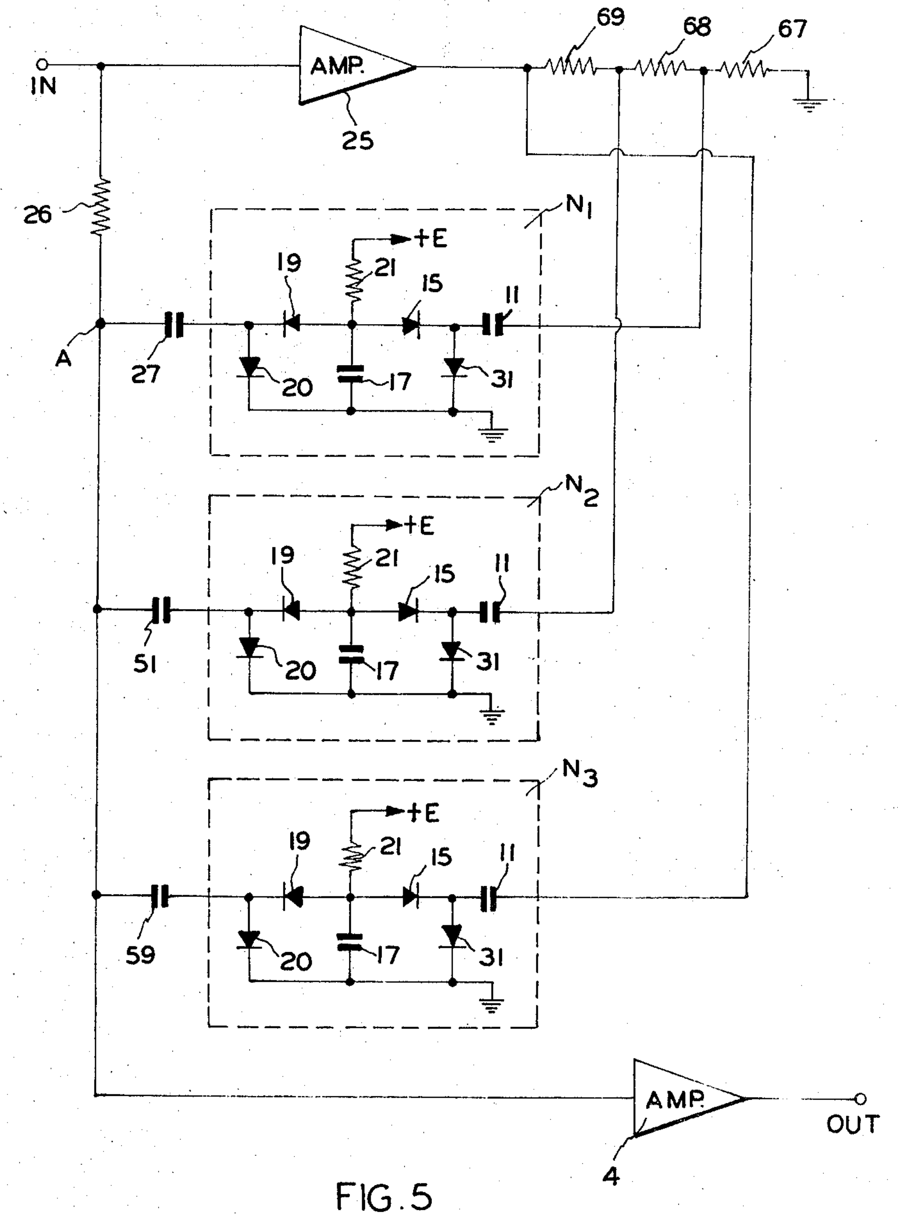
FIG. 5 is a circuit diagram of still another noise reduction system which improves the transient performance according to the present invention.

The embodiment shown in FIG. 5 is another circuit which improves the performance during the transient period of noise attenuation when a pause of the signal takes place. This improvement is achieved by stepwise expansion in the frequency range of the noise to be reduced by means of plural noise reduction circuits. In the circuit shown in FIG. 5, the input signal containing the back-ground noise is applied to a control signal amplifier 25 and to a point A through a common input resistor 26. The point A is connected to circuits in the $N_1$, $N_2$ and $N_3$, each enclosed by a dotted line, through capacitors 27, 51, and 59, respectively. The circuits in the blocks $N_1$, $N_2$, and $N_3$ are identical both as to circuit elements and connections and as to performance.

In the block $N_1$, the other end of the capacitor 27 connected to the point A is connected to a junction point of diodes 19 and 20 connected in series and having the poles in the same direction. The anode electrode of the diode 19 is connected to a positive D.C. supply, not shown but indicated at +E, through a resistor 21 and to a capacitor 17, the other side of which is connected to ground. The cathode electrode of the diode 20 is grounded. The anode electrode of a rectifier diode 15 is connected to the junction point of the resistor 21 and the capacitor 17 and the cathode electrode thereof is connected to a diode 31, the cathode electrode of which is grounded, and to a voltage divider through a capacitor 11.

The voltage divider consists of resistors 67, 68 and 69 connected in series and serves to apply a different voltage to the rectifier diode of each of the circuits in blocks $N_1$, $N_2$ and $N_3$. The other end of the resistor 67 is grounded and the other end of the resistor 69 is connected to the output terminal of the control signal amplifier 25. The connections between the voltage divider and the capacitor 11 of the circuits of blocks $N_1$, $N_2$ and $N_3$ is as follows: the circuits of block $N_1$ is connected to the junction point of the resistors 67 and 68, the circuits of block $N_2$ is connected to the junction point of the resistors 68 and 69, and the circuits of block $N_3$ is connected to the hot end of the voltage divider. The output signal is derived through an output amplifier 4 from the point A and is applied to a load arrangement.

Referring to FIG. 5, since the circuit of block $N_1$ is essentially similar to the circuits as shown in FIGS. 2, and 4, the operation of the circuit will be described only briefly. When the input signal exceeds the threshold level, the diodes 19 and 20 are biased reversely by the voltage stored in the capacitor 17. Therefore the signal at the point A is not passed to ground through the capacitor 27 but is fed to the output amplifier 4. When the input signal is lower than the threshold level, the forward current flows to the diodes 19 and 20. In this case, the signal at the point A is passed to ground through the capacitor 27, and accordingly the signal is not applied to the output amplifier 4.

In this circuit block $N_1$, the attack time can easily be set to have a value less than 10 ms. as in the embodiments shown in FIGS. 2, 3 and 4. The discharging time constant is determined by the capacitor 17 and the resistor 21.

The capacitances of the capacitors 27, 51, and 59 are chosen so as to be in the relationship by $C_1<C_2<C_3$, where $C_1$, $C_2$ and $C_3$ are capacitors of the capacitors 27, 51 and 59, respectively, and are chosen so that the capacitor 27 passes frequency components higher than 10 kHz., the capacitor 51 passes frequency components higher than 1 kHz., and the capacitor 59 passes the all frequency components, during the time diodes 19 and 20 are conductive. Moreover, the control signals supplied from the voltage divider to the circuit of blocks $N_1$, $N_2$ and $N_3$ are to be lowest for the circuit of block $N_1$, moderate for the circuit of block $N_2$, and highest for the circuit of block $N_3$. Accordingly, the threshold levels of the circuits of the blocks are the highest for the circuit of block $N_1$, moderate for the circuit of block $N_2$, and lowest for the circuit of block $N_3$. The highest threshold level should be approximately equal to the noise level at the point A.

As a result, when the signal pauses, first the diodes of circut of block $N_1$ become conductive and the frequency components higher than 10 kHz. are passed to ground through the capacitor 27. Next, when the noise level falls to the threshold level of the circuit of block $N_2$ by attenuation in the circuit of the block $N_1$, the diodes of the circuit of block $N_2$ become conductive and the frequency components higher than 1 kHz. are passed to ground through the capacitor 51. Finally, when the noise level reaches the threshold level of the circuit of block $N_3$ by attenuation in the circuit of the block $N_2$, the diodes of the circuit of block $N_3$ become conductive and the overall noise components are passed to ground through the capacitor 59. Accordingly, when the input signal pauses, the noise is reduced for the high frequency band, the middle frequency band, and the low frequency band, stepwise and in the recited order. This type of noise reduction is very comfortable for the hearing. Of course an input signal which exceeds the threshold level is not attenuated, but is amplified by the output amplifier 4, and applied to the load arrangement.

Figure 6:
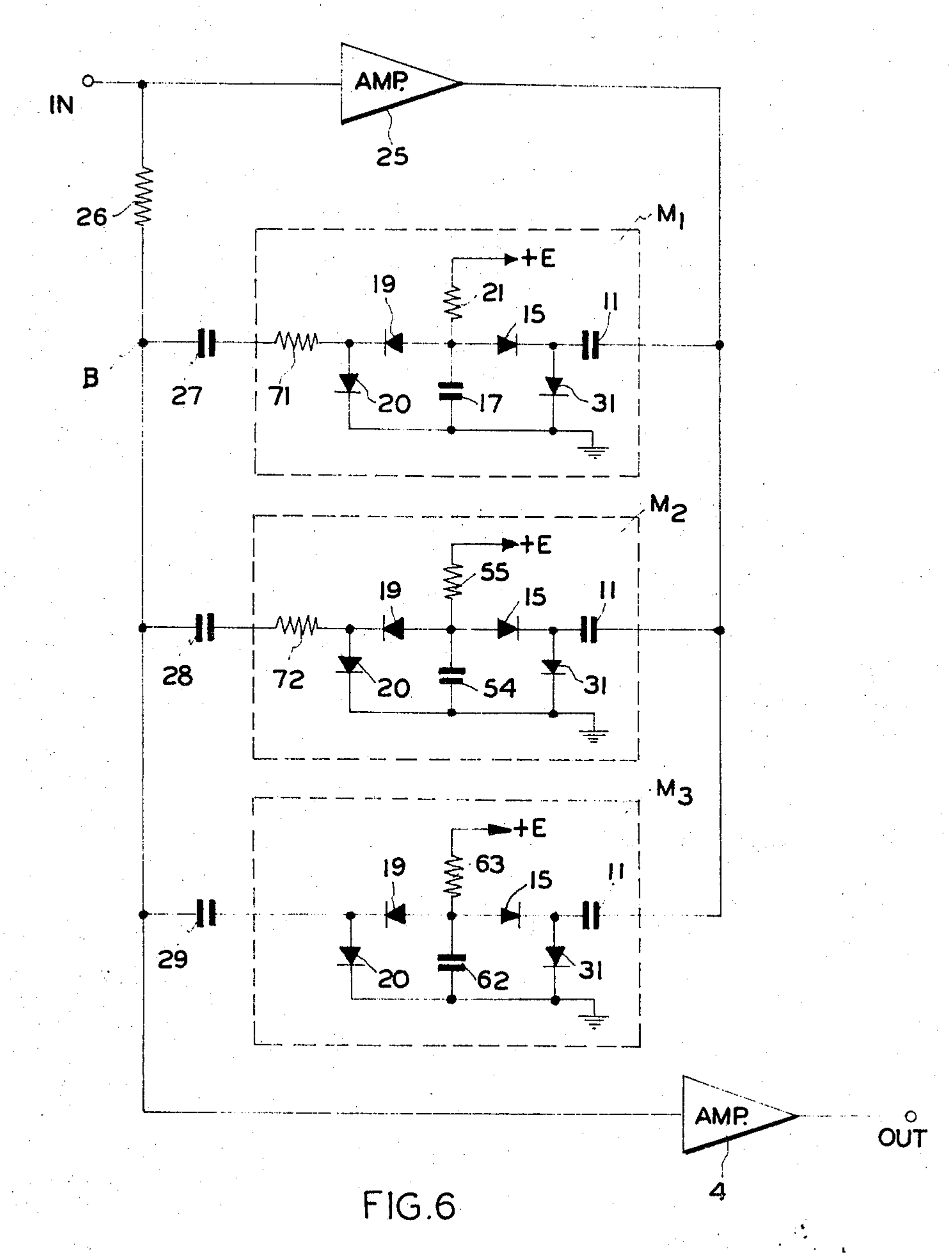
FIG. 6 is a circuit diagram of a further noise reduction system which improves the transient performance according to the present invention.

The embodiment shown in FIG. 6 is another circuit which improves the performance during the transient period of noise attenuation when a pause in the signal takes place by means of stepwise reduction of noise by using a plurality of noise reduction circuits.

In the circuit shown in FIG. 6, the input signal containing the back-ground noise is applied to a control signal amplifier 25 and to a point B through a common input resistor 26. The point B is connected to circuits in blocks $M_1$, $M_2$, and $M_3$ enclosed by dotted lines, through capacitors 27, 28, and 29 respectively.

In the circuit of block $M_1$, the other end of the capacitor 27 connected to the point B is connected through a resistor 71 to a junction point of diodes 19 and 20 connected in series and having the poles in the same direction. The anode electrode of the diode 19 is connected to a positive D.C. supply, not shown but indicated as +E, through a resistor 21 and to a capacitor 17, the other end of which is connected to ground. The cathode electrode of the diode 20 is grounded. The anode electrode of a rectifier diode 15 is connected to the junction point of the resistor 21 and the capacitor 17 and the cathode electrode thereof is connected to the diode 31, the cathode electrode of which is grounded, and to the output of the control signal amplifier 25 through a capacitor 11. The block circuit of the $M_2$ is the same as that of the block $M_1$ except that the resistor 72 has a relatively low resistance in comparison with the resistor 71 and the time constant of the combination of the resistor 55 and capacitor 54 is relatively high in comparison with the time constant of the combination of the resistor 21 and the capacitor 17. The circuit of the block $M_3$ is the same as that of the block $M_2$ except that a resistor such as the resistor 72 is omitted and the time constant of the combination of the resistor 63 and capacitor 62 is relatively high in comparison with the time constant of the combination of the resistor 55 and the capacitor 54. The output signal is derived through an output amplifier 4 from the junction point B, and applied to a load arrangement.

Referring to FIG. 6, since the circuit of block $M_1$ is essentially the same as the circuits as shown in FIGS. 2, 3, and 4, the operation of the circuit will be described only briefly. When the input signal exceeds the threshold level the diodes 19 and 20 are biased reversely by the voltage stored in the capacitor 17. Therefore, the signal at the point B is not passed to ground through the capacitor 27 and the resistor 71, but fed to the output amplifier 4. When the input signal is lower than the threshold level, the forward current flows to the diodes 19 and 20. In this case, the signal at the point B is passed to ground through the capacitor 27 and the resistor 71. Thus the signal applied to the output amplifier 4 becomes low in magnitude.

In the circuit in the block $M_1$, the attack time is easily set to a value lower than 10 ms. as in the embodiment shown in FIGS. 2, 3, and 4. The discharge time constant is determined by the capacitor 17 and the resistor 21. The threshold level is adjusted by varying the gain of the control signal amplifier 25. The attenuation carried out in the circuit of each block is determined by the resistance of the input resistor 26, the resistor 71 and the forward resistance of the diodes 19 and 20. The discharge time constant of the circuit in each of blocks $M_1$, $M_2$, and $M_3$ is arranged so as to be in the relationship $\tau_1<\tau_2<\tau_3$, where $\tau_1$, $\tau_2$ and $\tau_3$ are time constant of the circuits of the blocks $M_1$, $M_2$ and $M_3$, respectively. These different time constants are obtained either by properly selecting resistors 21, 55 and 63 or capacitors 17, 54 and 62. The attenuation of the circuit of block $M_1$ is lower than that of the circuit of block $M_2$ because the resistor 71 has a larger resistance than the resistor 72. The attenuation of the circuit of block $M_2$ is lower than that of the circuit of block $M_3$ because the circuit of block $M_3$ does not have a resistor such as resistor 72. As a result, when the signal pauses, first the diode of the circuit of block $M_1$ which has the smallest discharge time constant $\tau_1$ becomes conductive and the noise is reduced by an attenuation due to the circuit of block $M_1$. Next, the diode of the circuit of block $M_2$ which has a middle discharge time constant $\tau_2$ becomes conductive, and an attenuation due to the circuit block $M_2$ is added to the noise attenuation produced by the circuit of block $M_1$. Finally the attenuation due to the circuit of block $M_3$ which has a large discharge time constant $\tau_3$ is further added to that produced by the other circuits, and the noise is greatly reduced. That is, the noise is reduced gradually, by means of the stepwise attenuation as mentioned above when the input signal pauses. This type of noise reduction is natural and very comfortable for the hearing. Of course when the input signal exceeds the threshold level, the signal is not attenuated but amplified by the output amplifier 4 and applied to the load arrangement. The stepwise reduction of noise, in the circuit shown in FIG. 5, is carried out by means of the voltage divider, whereas, in the circuit of FIG. 6, it is carried out by means of the different discharging time constants of the rectifier stored voltages. Of course, it is apparent that the interchange of these means of stepwise reducing noise or other variations can be provided.

Figure 7:
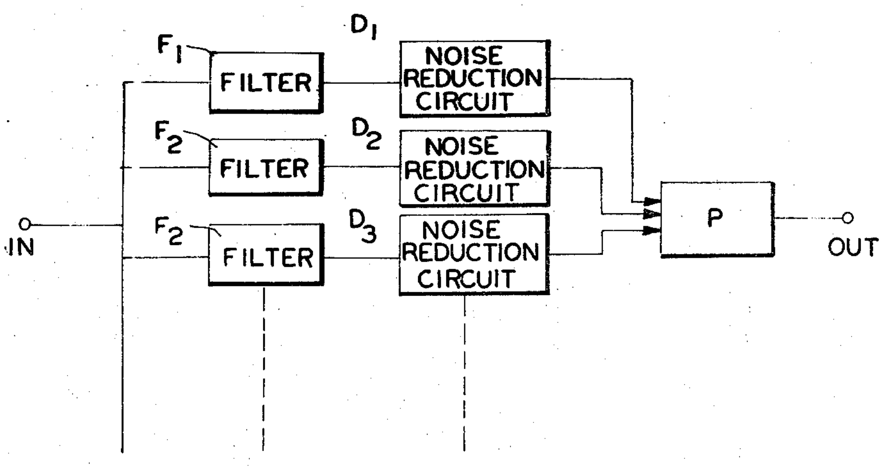
FIG. 7 is a block diagram of a noise reduction system which is suitable for reducing the modulation noise according to the present invention.

The system of FIG. 7 is capable of reducing the noise not only during pauses in the signal, but during existence of the signal.

In FIG. 7, there is shown a noise reduction system in which there are a number of sub-channels consisting of the combination of a filter F and a noise reduction circuit D, which noise reduction circuits are similar to the circuits of FIGS. 1, 2, and 4 in operation, and one mixer P for adding the output of each of the sub-channels together. The suffix numbers 1, 2, 3, 4 . . . of the bandpass filters F and the noise reduction circuits D designate the respective channel number.

An input signal containing noise is split into sub-band frequencies by filters F. The noise reduction circuit following the filter acts to stop the transmission of the signal to the mixer P when the level of the split portion of the signal having frequency components within the pass-band of this channel is lower in magnitude than the threshold level.

For the purpose of describing the circuit operation, the assumption is made that the frequencies of the input signal are within the bandwidth which is covered by sub-channels 1 and 2 (filters $F_1$ and $F_2$ whereas the noise component is within the frequency band of the sub-channel 3 (the filter $F_3$). The signal component which is applied to the sub-channels 1 and 2 passes to the mixer P because the noise reduction circuits of these channels are not effective for signals having large magnitude. On the other hand, since the noise component is lower in magnitude than the threshold level of the noise reduction circuit of the sub-channel 3, it is removed from the input of the mixer P. Therefore, a noise-free output signal is derived from the mixer P.

The system as shown in FIG. 7 is suitable to remove the modulation noise which occurs in disc and tape recording systems. The frequency-band of each sub-channel, or each filter, and the number of sub-channels can be chosen arbitrarily according to the desired noise reduction.

Figure 8:
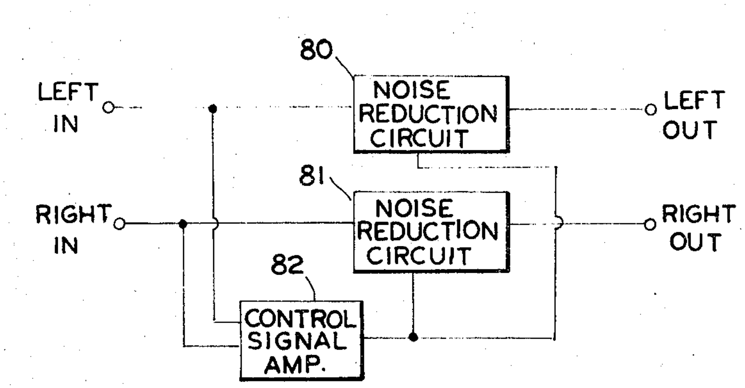
FIG. 8 is a block diagram of a stereophonic amplifier system employing the noise reduction circuit according to the present invention.

FIG. 8 is a circuit diagram of stereophonic amplifiers including a noise reduction circuit according to the invention.

The system of FIG. 8 includes a control signal amplifier 82 and two noise reduction circuits 80 and 81 similar to the circuits of FIGS. 1, 2, and 4, in operation. The input signals of both the left and right channels are supplied to the input of noise reduction circuits 80 and 81 respectively and to the input terminal of the control signal amplifier 82 which adds the input signals together. The output signal of the control signal amplifier 82 is supplied to both noise reduction circuits 80 and 81, controlling the operation of the noise reduction circuits. In the circuit of FIG. 8, the control signal amplifier 82 can be arranged in such a way that the D.C. control voltage which controls the noise reduction circuit is proportional to an average value or sum or higher value of the inputs of both channels. In this case, the two noise reduction circuits 80 and 81 are not effective so long as an input signal which is larger than the threshold level is present either in the left channel or in the right channel. They become effective when the input signal is not present in either channel, thus allowing natural sound reproduction.

While there have been described and illustrated some forms of circuits for providing suitable noise reduction in audio amplifiers, it is natural that many other modifications or variations may be employed.

What is claimed is:

1. A signal noise reduction system comprising a common resistor, an output means, a voltage divider means, and a plurality of noise reduction circuits; one end of said common resistor having an input terminal for the system coupled to one end thereof, the input sides of said noise reduction circuits being commonly connected to the other end of said common resistor, said output means being connected to the junction of said common resistor and said noise reduction circuits, said voltage divider means being coupled to the input terminal for receiving a signal related to the input signal and being coupled to each of said noise reduction circuits, said noise reduction circuits each comprising variable resistance means including at least two diodes, the resistance of which is varied in accordance with the bias of said diodes; input means coupled between the input side of the noise reduction circuit and said variable resistance means for applying a signal from said common resistor to said variable resistance means; biasing means coupled to said variable resistance means for providing a forward bias to said diodes when no input signal is present; and rectifier means coupled between said variable resistance means and said voltage divider for providing a D.C. voltage which is proportional to the signal from said voltage divider means to said diodes and biasing said diodes reversely.

2. A system as claimed in claim 1, wherein said input means include a capacitor, the capacitor having a different capacitance value in each of said noise reduction circuits.

3. A system as claimed in claim 2, wherein said voltage divider means includes means for providing a signal of voltage to said rectifier means in each noise reduction circuit having a voltage amplitude different from that supplied to the other noise reduction circuits.

4. A system as claimed in claim 2, wherein said biasing means includes a bias resistor and a D.C. power supply connected to said diodes through said bias resistor so as to provide the forward bias to said diodes, said rectifier means having a storage capacitor which stores a D.C. voltage to bias said diode reversely and being connected to both said variable resistor means and said biasing means so as to discharge said D.C. voltage to ground through said bias resistor, each of said noise reduction circuits having a different time constant for the combined storage capacitor and bias resistor.

5. A system as defined in claim 1, wherein said input means includes a resistor and a capacitor in series having a characteristic so that at the range of signal frequencies its reactance is much lower than the resistance of said resistor.

6. A system as defined in claim 5, wherein said voltage divider means is coupled to said noise reduction circuits so as to provide a signal of different amplitude to said rectifier means in each noise reduction circuit.

7. A system as defined in claim 5, wherein said biasing means includes a bias resistor and a D.C. power supply and is connected to said diodes through said bias resistor so as to provide a forward bias to said diodes, said rectifier means having a storage capacitor which stores a D.C. voltage to bias said diodes reversely and being connected to both said variable resistor means and said biasing means so as to discharge said D.C. voltage to ground through said bias resistor, and each of said noise reduction circuits having a different time constant for the combined storage capacitor and bias resistor.

8. A signal noise reduction system comprising a plurality of sub-channels each including a filter means and a noise reduction circuit; an input terminal in each of said filter means for applying an input signal thereto; a mixer means coupled to said sub-channels for the output of said noise reduction circuits together, said noise reduction circuits each comprising variable resistance means including at least two diodes, the resistance of which is varied in accordance with the bias of said diodes, an input resistor coupled to said variable resistance means through which a signal from said filter means is applied to said variable resistance means, biasing means coupled to said diodes for providing a forward bias on said diodes when no input signal is present, and rectifier means for supplying a D.C. voltage which is proportional to the signal through said filter to said diodes and for reversely biasing said diodes.

9. A noise reduction system for a stereophonic amplifier comprising a noise reduction circuit in the left and right channels of said amplifier, respectively, said noise reduction circuit each comprising variable resistance means including at least two diodes, the resistance of which is varied in accordance with the bias of said diodes, an input resistor coupled to said variable resistance means through which a signal is applied to said variable resistor means and for deriving an output signal to be supplied to a load, biasing means coupled to said diodes for providing a forward bias to said diodes when no input signal is present, and rectifier means coupled to said variable resistance means for providing a D.C. voltage which is proportional to the signal in both the left and right channel signals to said diodes and reversely biasing said diodes.

10. A noise reduction circuit comprising variable resistance means including a first diode and second diode connected in series, the resistance of which is varied in accordance with the bias of said diodes; an input resistor having an input terminal connected to one end thereof and having the other end connected to the junction between said diodes; biasing means including first and second resistors connected to the opposite ends of said series connected diodes and a D.C. power supply connected to said resistors so as to flow a forward current into said diodes when no input signal is present; output means being connected to said junction of a first diode and second diode for deriving a signal from said variable resistance means and for supplying an output signal to a load; and rectifier means for supplying a D.C. voltage which is proportional to the input signal to the diodes so as to bias said diodes of said variable resistance means reversely, said rectifier means being connected between the junction of said first resistor and first diode and the junction of said second resistor and second diode and having two capacitors connected between the junctions of the resistors and the diodes and ground, whereby the input signal is attenuated when the amplitude of the input signal is lower than a predetermined threshold level and the input signal is passed when the amplitude of the input signal exceeds said predetermined threshold level.

11. A noise reduction circuit comprising variable resistance means comprising a first diode and second diode connected in series, the resistance of which is varied in accordance with the bias of said diodes; an input resistor having an input terminal connected to one end thereof and having the other end connected to the junction between said diodes; biasing means including a resistor connected in series at the other end of first diode of said series connected diodes, the other end of said series connected diodes being grounded, and a D.C. power supply connected across said series combination of resistor and diodes so as to flow a forward current into said diodes when no input signal is present; output means being connected to said junction of first diode and second diode for deriving a signal from said variable resistance means and for supplying an output signal to a load; and rectifier means being connected between the junction of said resistor of said biasing means and first diode, having a capacitor means connected between said junction of the resistor and the diode and ground for supplying a D.C. voltage which is proportional to the input signal to the diodes so as to bias said diodes of said variable resistance means reversely, whereby the input signal is attenuated when the amplitude of the input signal is lower than a predetermined threshold level and the input signal is passed when the amplitude of the input signal exceeds said predetermined threshold level.

12. A noise reduction circuit as claimed in claim 11, further including a series combination of a resistor and a diode which is connected across the output side of said rectifier means so as to vary the discharge time constant of D.C. voltage stored in the capacitor of said rectifier means.

References Cited

UNITED STATES PATENTS

| | | | |
|---|---|---|---|
| 2,171,671 | 9/1939 | Percival | 330—145X |
| 2,340,364 | 2/1944 | Bedford | 330—126X |
| 2,528,885 | 11/1950 | Hendricks | 330—145 |
| 3,023,369 | 2/1962 | Horowitz | 350—145X |

ROY LAKE, Primary Examiner

J. B. MULLINS, Assistant Examiner

U.S. Cl. X.R.

330—126, 141, 145, 149